A. BEVERLY.
FRUIT PICKER.
APPLICATION FILED OCT. 9, 1914.
1,130,057.
Patented Mar. 2, 1915.
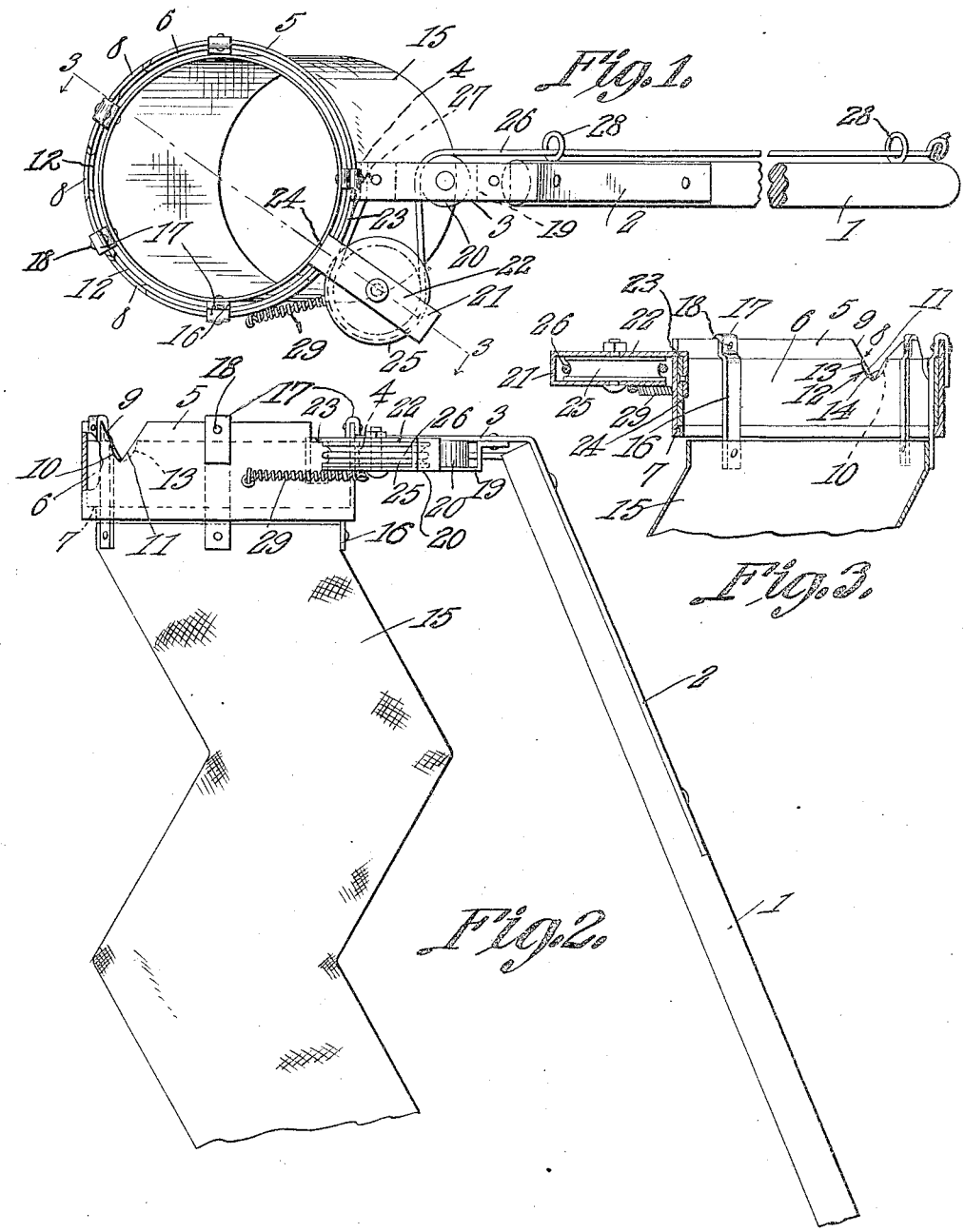

UNITED STATES PATENT OFFICE.

ALEXANDER BEVERLY, OF GLACIER, WASHINGTON.

FRUIT-PICKER.

1,130,057.  Specification of Letters Patent.  Patented Mar. 2, 1915.

Application filed October 9, 1914. Serial No. 865,906.

*To all whom it may concern:*

Be it known that I, ALEXANDER BEVERLY, a citizen of the United States, residing at Glacier, in the county of Whatcom and State of Washington, have invented a new and useful Fruit-Picker, of which the following is a specification.

The present invention appertains to fruit pickers or gatherers, and aims to provide a novel and improved contrivance of that character, whereby the fruit may be conveniently and quickly picked from trees, without the necessity of climbing the trees or employing a ladder.

It is also the object of the invention to provide a picking or plucking head of unique construction and operation, for receiving and detaching the fruit, means being provided for conducting the fruit in a careful manner to the ground.

Another object of this invention is to provide novel means for actuating the picking head.

It is also within the scope of the invention, to provide a fruit picker of comparatively simple and inexpensive construction, which may be readily manipulated for picking or gathering the fruit, and which will be convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The present invention has been illustrated in its preferred embodiment in the accompanying drawing, wherein:—

Figure 1 is a plan view of the improved picker, a portion of the handle or staff being broken away. Fig. 2 is a side elevation of the device, parts being broken away. Fig. 3 is a sectional view taken on the line 3—3 of Fig. 1.

In carrying out the present invention, there is employed a handle or staff 1 of suitable length, and which is arranged to be normally held in an inclined position during the picking operation. A bar or strip 2 is secured upon the upper end portion of the handle 1, and is provided with the horizontally or angularly extending portion 3 projecting over the upper end of the handle, and terminating in a deflexed or downturned ear 4 to which the picking or plucking head is secured. The picking or plucking head embodies a stationary or fixed ring or annulus 5 constructed of metal, and having its rear portion riveted or otherwise secured to the ear 4 of the bar or bracket 2, whereby the ring 5 will be disposed in a horizontal position when the handle 1 is held inclined, as seen in Fig. 2. Mounted snugly for oscillation within the outer ring 5, is an inner ring or annulus 6, which is narrower in width than the ring 5, and the lower edge of which rests upon an inner annular ledge or shoulder 7 formed at the lower edge of the ring 5. The upper edge of the inner ring 6 is spaced below the upper edge of the outer ring 5.

The ring 5 is provided with a plurality of notches or recesses 8 in its upper edge and at the forward side thereof, the notches 8 extending below the upper edge of the ring 6, and having the flared mouths 9 above the upper edge of the inner ring. One side edge of each notch 8 is curved, as at 10, while the other side edge is straight, as at 11, and the edges of the notches 8 are sharpened to present sharp cutting edges against the periphery of the inner ring 6. The inner ring 6 is provided with notches 12 in its upper edge which normally register or coincide with the notches 8 of the ring 5, those edges of the notches 12 opposite the curved edges 10 of the notches 8, being curved, as at 13, while the other edges 14 of the notches 12 are straight. Thus, the curved and straight edges of the notches 8 and 12 are reversed upon the two rings. The edges 13 and 14 of the notches or recesses 12 are also sharpened to present sharp cutting edges against the interior of the outer ring 5. The two rings 5 and 6 thus provide a pair of coöperating annular cutters, which are arranged to oscillate relative to one another, and one of which is fixed or stationary and carried by the upper end of the handle.

In order to conduct the fruit from the picking head to the ground, a fabric chute 15 is carried by and extends downwardly from the picking head, the chute 15 being preferably zig-zagged or sinuous to retard the gravitation of the fruit through the chute, so that the fruit will not become bruised. The chute 15 enables the fruit to be discharged into a bag, or other receptacle for the fruit. As a means for attaching the upper end of the chute 15 to the picking head, a plurality of straps 16 are secured in any suitable manner to the upper end of the chute, and project upwardly within the ring 6 and have their upper ends reflexed or bent backwardly, as at 17, to straddle the upper edge of the outer ring 5 above the upper edge of the inner ring 6. Rivets or other securing members 18 are engaged through the reflexed ends 17 of the straps 16, through the upper edge portion of the ring 5 and through the body portions of the straps 16, to cause the straps to depend interiorly from the upper edge of the outer ring 5 for supporting the upper end of the chute below the picking head. Thus, the straps 16, which are of leather or other similar material, not only assist in holding the ring 6 within the ring 5, but also serve as cushions or pads for preventing the fruit from being bruised in contacting accidentally or casually with the upper edge of the annular cutting or picking head. The straps 16 also enable the upper end of the chute to have a slight movement relative to the picking head, and at the same time, the straps will properly conduct the fruit from within the picking head into the chute. Some of the straps 16 are arranged between or at the sides of the notches 8 of the ring 5 for the above purposes.

The actuating means for oscillating the ring or annular cutter 6 embodies a U-shaped bar 19 having its ends bent angularly and riveted or otherwise secured to the bottom of the portion 3 of the bar 2, and a roller or pulley 20 is journaled between the bottom portion of the bar 19 and bar 2. A U-shaped bar or bracket 21 has its upper arm 22 working through a slot or elongated recess 23 formed in the upper edge of the ring 5 adjacent the rear or inner side of the said ring, and the end of the arm 22 is bent downwardly, as at 24, and riveted or otherwise secured to the interior of the ring 6. The edge of the slot or recess 23 is flush with the upper edge of the ring 6, and the bar 21 projects radially from the ring 6 so as to work through the slot 23, and also limit the oscillation of the ring 6. A pulley wheel 25 is journaled between the upper and lower arms of the U-shaped member 21, and an actuating cable, cord or flexible element 26 has its upper end anchored to the rivet or securing member 27 which attaches the outer end of the bar 19 to the portion 3 of the bar 2. From the rivet or element 27, the cable 26 is passed around the pulley 25 carried by the bar 21 of the ring 6, and the cable is then passed around the pulley 20. From the pulley 20, the cable 26 is passed through the eyes of eye screws or guide members 28 secured to one side of the handle 1 at various points along the length thereof. Thus, the cable 26 is extended to the lower end of the handle 1, in order that it may be readily pulled by the operator who is manipulating the handle for picking the fruit.

A coiled wire retractile spring 29 has one terminal connected to the lower arm of the bar 21, and has its other terminal anchored to the outer side or periphery of the ring 5 for normally swinging the ring 6 clockwise, as seen in Fig. 1, to normal position. Thus, the spring 29 will normally swing the bar or member 21 away from the pulley 20, and will normally bring the notches 12 of the ring 6 into register with the notches 8 of the ring 5.

In use, the handle 1 may be readily manipulated by the operator who is standing upon the ground, for passing the annular picking head over the fruit. It is an easy matter for the operator to reach the fruit from the ground, and to so manipulate the picking head that the fruit will be received within the rings 5 and 6 of the picking head with the stem of the fruit passing through one of the registering pairs of notches 8 and 12. Then, by pulling the cord 26, the loop of the cord or cable 26 between the securing element 27 and pulley 20 and passing around the pulley 25, will be contracted, so as to swing the bar 21 toward the pulley 20, and thereby swing the ring 6 counterclockwise, as seen in Fig. 1. This will cause the cutting edges of the respective notches 8 and 12 to sever the stem of the fruit, so that the fruit will drop into the chute and be gradually conducted down the chute to the receptacle. When the cord or cable 26 is released, the ring 6 will be returned to normal position under the influence of the spring 29, for a new operation.

With the present device, the fruit may be readily harvested, and without danger of bruising the fruit. The other advantages and capabilities of the present contrivance will be obvious to those versed in the art, it is thought, without further comment being necessary.

Having thus described the invention, what is claimed as new is:—

A picking device comprising a handle, a picking head carried by the upper end thereof and embodying outer and inner rings having upper notches adapted to normally register, means for supporting the inner ring for oscillation within the outer ring, the outer ring being attached to the upper end of the handle, the upper edge of the inner ring being spaced below the upper edge of the outer ring, means for oscillating the inner ring, straps disposed within said rings and having their upper ends secured to and passing over the upper edge of the outer ring, some of the straps being disposed at the sides of the notches of the outer ring, and a chute attached to the lower ends of the said straps below the said rings.

In testimony that I claim the foregoing as my own, I have hereto affixed my signature in the presence of two witnesses.

ALEXANDER BEVERLY.

Witnesses:
WILLIAM MARTINEAU,
FRANK E. BOTTIGER.

Copies of this patent may be obtained for five cents each, by addressing the "Commissioner of Patents, Washington, D. C."